UNITED STATES PATENT OFFICE.

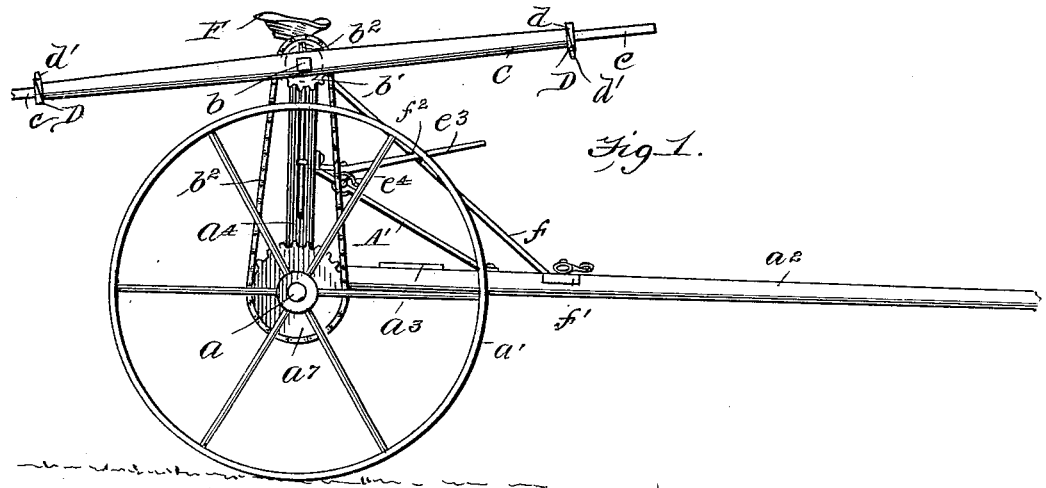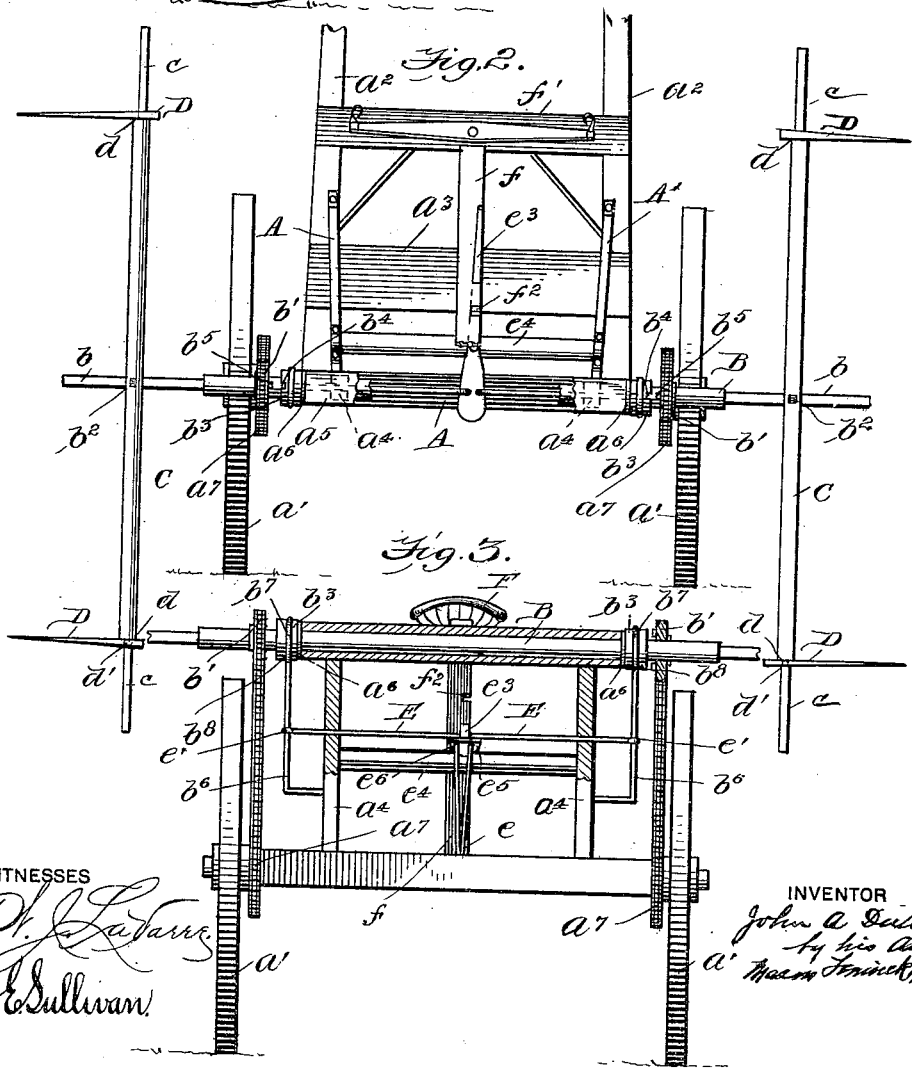

JOHN A. DIXON, OF LYKESLAND, SOUTH CAROLINA.

STALK-CUTTER.

SPECIFICATION forming part of Letters Patent No. 621,229, dated March 14, 1899.

Application filed April 2, 1898. Serial No. 676,235. (No model.)

*To all whom it may concern:*

Be it known that I, JOHN A. DIXON, a citizen of the United States, residing at Lykesland, in the county of Richland and State of South Carolina, have invented certain new and useful Improvements in Stalk-Cutters; and I do hereby declare the following to be a full, clear, and exact description of the invention, such as will enable others skilled in the art to which it appertains to make and use the same.

My invention relates to improvements in stalk-cutters, and is particularly adapted for cutting cornstalks and cotton-stalks.

It consists in certain novel constructions, combinations, and arrangements of parts, as will be hereinafter more fully described and claimed.

In the accompanying drawings, Figure 1 represents a side elevation of my improved stalk-cutter. Fig. 2 represents a top plan view of the same, the seat and part of the supporting-frame being removed to better show the mechanism for throwing the operating parts into and out of engagement; and Fig. 3 represents a rear elevation, the bearing supporting the revolving shaft being shown in section.

A in the drawings represents the frame of my improved stalk-cutting machine; B, a revolving shaft; C, knife-carrying arms, and D knives carried by the said arms.

The frame A consists of a cross shaft or axle, as $a$, which is mounted upon the side supporting-wheels $a'\ a'$. Suitable shafts, as $a^2\ a^2$, are secured to the said axle and adapted to receive a horse for pulling the machine in the usual manner. A cross-brace, as $a^3$, connects the shafts near the axle and also affords a foot-rest for the party driving the team. Uprights or supports, as $a^4\ a^4$, are mounted upon the axle $a$ and carry a cross bearing-bar, as $a^5$, at their upper ends. The bearing-bar $a^5$ is preferably made hollow and formed with a bearing, as at $a^6$, interiorly thereof to receive the revolving shaft B. The shaft B extends above and beyond the main wheels $a'\ a'$ and is provided on its ends with squared portions, as at $b\ b$. Upon these squared portions are fitted knife-carrying arms, as C C, which are provided with squared sockets to fit the squared portions of the shafts, so that when the said shaft revolves the arms will be carried with it. A set-screw, as $b^2$, may be employed to secure each of the said arms in place upon the squared portions $b\ b$. It will thus be apparent that the arms can be moved in or out upon the squared portions to adjust the width of the cut made by the machine. The arms C are also provided at their ends with squared portions, as at $c$, upon which are secured cutting-knives, as D, which extend at right angles to the arms C. The knives are preferably made with sharp edges upon their cutting sides and are provided with sockets, as at $d$, to fit upon the squared ends of the arms C. These squared end portions are made of sufficient length to permit of adjustment of the knives upon the same at a greater or less distance from the ends of the arms, set-screws, as $d'$, or other suitable means being employed to secure the knives in their adjusted positions. By the adjustments of the knives in this manner the distance from the ground at which the cut will be made can be regulated to suit the circumstances.

In order to revolve the shaft B, pinions, as $b'$, are loosely mounted upon the shaft B and are connected by means of the sprocket-chains, as $b^2$, with sprocket-wheels $a^7$, which are rigidly connected to the hub of the wheels $a'$, so as to revolve therewith. Sliding clutches, as $b^3\ b^3$, are also mounted upon the shaft B and are provided with notched portions, as at $b^4$, adapted to engage a rib or fin, as $b^5$, upon the side of each of the pinions $b'$. When the clutches $b^3$ are moved longitudinally of the shaft B and the socket $b^4$ is brought into engagement with the fin or rib $b^5$, the motion of the pinion $b'$ will be communicated through the said clutch to the shaft B. In order to move the clutches $b^3$ into and out of engagement with the pinions $b'$, levers, as $b^6\ b^6$, are pivotally mounted at one end to the frame A and are provided at their opposite ends with bifurcated portions, as $b^7$, adapted to engage peripheral grooves, as $b^8$, formed upon the clutches $b^3$. Angle-levers, as E, are pivotally secured at one end to the axle $a$, as at $e$, and are provided at their opposite ends with loops or apertures, as $e'\ e'$, which surround the levers $b^6$, the said levers E being guided in their movement by apertures $e^2\ e^2$, formed in the uprights or standards $a^4\ a^4$. An operating-lever, as $e^3$, is pivotally secured to a rock bar or shaft $e^4$, which is pivoted at its ends to braces A', which extend from the shafts, as $a^2$, to the uprights $a^4$. The rear end of the lever $e^3$ is provided with a flattened broadened portion, as $e^5$. The flattened portion has apertures or holes formed in it, as at $e^6$, which are adapted to receive the levers E E. When the rear end of the operating-lever $e^3$ is forced upwardly, the levers E E will be drawn toward each other and the clutches $b^3$ $b^3$ will be drawn out of engagement with the pinions $b'$ $b'$ and the revolving of the shaft B and the knives will cease. Upon the rear end of the operating-lever $e^3$ being depressed the levers E E will be spread apart and caused to force the clutches $b^3$ $b^3$ into engagement with the pinions $b'$ and the shaft B will receive motion from the wheels $a'$, thus causing the knives to be swung by their carrying-arms as the machine moves forward. A seat, as F, is mounted upon the bearing-bar $a^6$, which is to be occupied by the party driving the horse. A brace, as $f$, extends from the seat to the singletree cross-bar $f'$ of the shafts and not only serves to brace the bearing-bar of the machine, but provides a means for holding the operating-lever $e^3$ in its adjusted positions. In order to do this, the said brace $f$ is provided with notches, as at $f^2$ $f^2$, into which the lever $e^3$ may be thrust to hold it either up or down, according as the machine is in operation or disuse.

My improved machine is particularly well adapted for cutting cornstalks, as it is made comparatively narrow, and the arms C, carrying the knives, can be adjusted close to the frame of the machine, so as to enable the same to pass between two rows of corn and cut both at the same time. When cutting corn, the projecting squared portions of the shaft B will act as a support for the tops of the cornstalks, so that the knives will cut the lower portions of the stalks much more readily. Of course the knife-carrying arms, as above described, may be adjusted to any width that may be required. The knives D by their adjustment upon the carrying-arms C enable me to cut close to the ground or high up from the same, as may be wished.

My machine is not only adapted for cutting cornstalks, but it is quite well adapted for cutting cotton-stalks and for other similar uses.

It is apparent that certain changes could be made in the arrangement of the operating devices without departing from the spirit of my invention—as, for example, instead of having one revolving shaft B two shafts of shorter length might be mounted on each side of the frame. So, also, the clutch instead of being mounted upon the shaft B might be mounted upon the wheels $a'$, so as to throw the gear-wheels $a^7$ into or out of gear to regulate the movement of the cutting-arms, and also that two arms carrying knives might be employed on each end of the shaft instead of one arm and arranged at right angles to each other.

Having now described my invention, what I claim as new, and desire to secure by Letters Patent, is—

1. In a stalk-cutter having a revoluble knife-carrying shaft, the combination with gearing connecting the said shaft with the wheels of the machine, of clutches for controlling the said gearing, levers for operating the gearing and a hand operating-lever for adjusting the clutch-levers, an oscillating shaft supporting the said hand-lever, whereby the lever can be moved up and down, the said lever being pivotally secured to the said shaft so as to be capable of a lateral movement, and a seat post or brace provided with notches in its edge for engaging the said lever, whereby it may be held in different adjusted positions, substantially as described.

2. In a stalk-cutter, the combination with a suitable frame, of a revolving shaft, knife-carrying arms secured to the said shaft, and means connecting the wheels of the machine with the said shaft for revolving it, clutches upon the said shaft for engaging the operating means, levers secured at one end to the frame and at their free ends engaging the clutches, angle-levers engaging the said clutch-levers at one end and secured to the frame at the other, and a hand operating-lever engaging the said angle-levers so as to slip along the same whereby they will be drawn together or forced apart according to the direction in which the handle is moved, substantially as described.

3. In a stalk-cutter, the combination with a frame carrying a revoluble knife-carrying shaft, the combination of operating mechanism connecting the shaft with the wheels of the machine, clutches for controlling the said operating mechanism, levers engaging the said clutches, angle-levers for operating the said clutch, levers being secured at one end to the frame and having eyes in their other ends adapted to slide upon the clutch-levers, a hand operating-lever pivotally secured upon an oscillating shaft and having a broad lever-engaging end provided with apertures through which the angle-levers pass, the construction being such that when the hand operating-lever is moved the lever-engaging apertures will slide up and down upon the said angle-levers for drawing them together or separating them, substantially as described.

In testimony whereof I hereunto affix my signature in presence of two witnesses.

JOHN A. DIXON.

Witnesses:
W. A. CLARK,
WILL JONES.